(12) United States Patent
Guterman

(10) Patent No.: US 7,062,303 B2
(45) Date of Patent: Jun. 13, 2006

(54) SYNCHRONIZING POWER CONSERVATION MODES

(75) Inventor: Jose Guterman, Calgary (CA)

(73) Assignee: Intel Corporation, Santa Clara, CA (US)

(*) Notice: Subject to any disclaimer, the term of this patent is extended or adjusted under 35 U.S.C. 154(b) by 949 days.

(21) Appl. No.: 09/899,463

(22) Filed: Jul. 5, 2001

(65) Prior Publication Data

US 2003/0008690 A1 Jan. 9, 2003

(51) Int. Cl.
*H04B 1/38* (2006.01)
(52) U.S. Cl. ................ 455/574; 455/127.5; 455/343.5
(58) Field of Classification Search ............ 455/127.1, 455/127.5, 343.1, 343.2, 343.3, 343.4, 343.5, 455/343.6, 566, 572, 574
See application file for complete search history.

(56) References Cited

U.S. PATENT DOCUMENTS

| | | | | |
|---|---|---|---|---|
| 5,613,235 A | * | 3/1997 | Kivari et al. | 455/574 |
| 5,949,484 A | * | 9/1999 | Nakaya et al. | 348/384.1 |
| 6,275,712 B1 | * | 8/2001 | Gray et al. | 455/522 |
| 6,445,937 B1 | * | 9/2002 | daSilva | 455/574 |
| 6,501,968 B1 | * | 12/2002 | Ichimura | 455/574 |

* cited by examiner

*Primary Examiner*—Harry S. Hong
(74) *Attorney, Agent, or Firm*—Trop, Pruner & Hu, P.C.

(57) ABSTRACT

A communication transceiver may include a communications subsystem and an application subsystem. When one of the subsystems wishes to power down to save power, the other subsystem may defer or otherwise alter activities to accommodate and thereby synchronize with the powered down state of the other subsystem. This avoids unnecessarily recalling the powered down subsystem from the sleep mode and may result, in some embodiments, in improved efficiencies and reduced power consumption.

30 Claims, 3 Drawing Sheets

SYNCHRONIZING POWER CONSERVATION MODES

BACKGROUND

This invention relates generally to wireless devices, and particularly to wireless devices with a reduced power consumption mode.

A wireless device such as a cellular telephone may include two processors. One processor may be responsible for baseband processing and the other may be responsible for handling non-wireless applications such as telephone logs, call functions and the like. In other wireless devices, one processor may execute both communications functions and applications. Regardless of the number of processors, separate communications and application subsystems may exist.

In portable embodiments, preservation of battery life may be very critical. Thus, portable wireless systems may adopt reduced power consumption modes to increase the time between battery charges.

One of the two subsystems may power down to save power while the other one is still powered up. This may result in ineffective power consumption conservation.

Also, one of the subsystems may constantly call on the other subsystem, while the other subsystem is in the power conservation mode, in order to implement certain functions. Thus, each subsystem may constantly be pulled out of its lower power consumption mode by the other subsystem.

Generally, processor-based systems progressively power down. Some processor-based systems have several power consumption states. Based on a triggering of event such as lack activity, the system may power down to a lower power consumption state. After a period of continued inactivity, a system may power down to an even lower power consumption state.

If activity occurs, the system may then transition progressively to successively higher power consumption states. Because there is a time delay between the triggering event and the resumption of a full active state, it is undesirable to prematurely power down the system. In addition, performance of the system may suffer if the system is continually powering down and then immediately powering back up.

Because the communications and application subsystems are separate, their power consumption modes may tend to conflict. When one subsystem wants to power down, the other subsystem may need to be powered up. This may result in inconsistencies between the two subsystems. In addition, one subsystem may constantly cause the other subsystem to return to its full power consumption state.

In effect, each subsystem may constantly pull the other subsystem to a higher power consumption mode. This may result in system inefficiencies as well as increased power consumption.

Thus, there is a need to improve the power consumption operation of communication and application subsystems.

DETAILED DESCRIPTION

Figure 1:
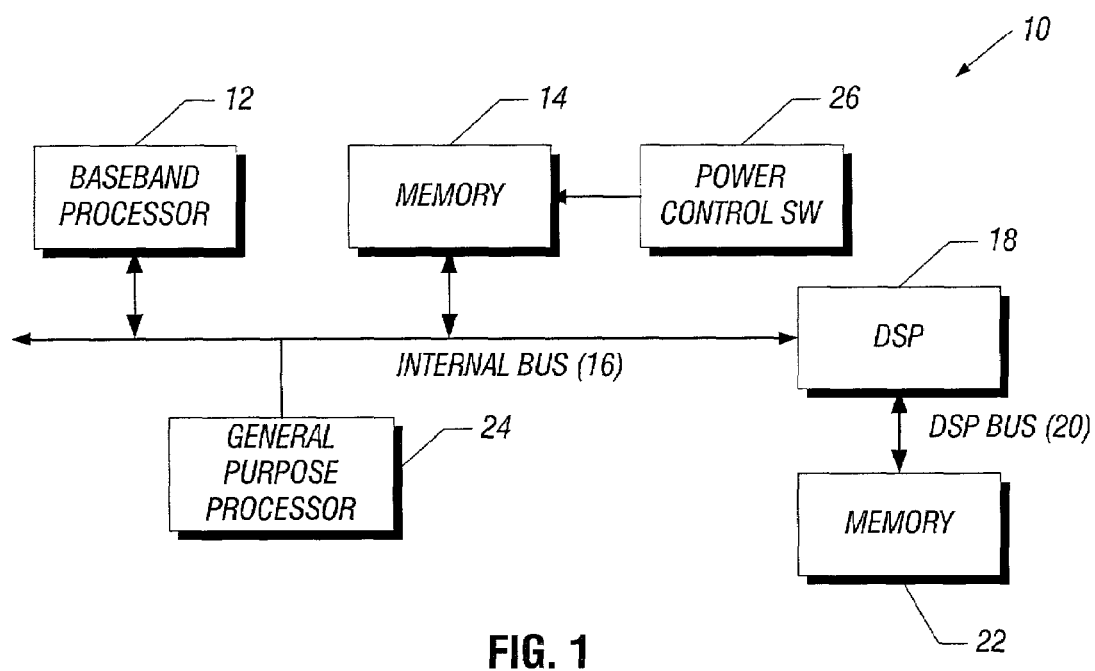
FIG. 1 is a schematic depiction of one embodiment of the present invention.

Referring to FIG. 1, in one embodiment, a wireless device 10 may include a baseband processor 12 that controls a communications subsystem and a general purpose processor 24 that executes other applications, not directly related to implementing wireless communications. In one embodiment, the device 10 may be a wireless telephone. In other embodiments, the device 10 may be any wireless device such as a wireless networking device for computer systems.

The baseband processor 12 and general purpose processor 24 may communicate over an internal bus 16 in one embodiment. Also coupled to that bus is a memory 14 that may store software 26 for synchronizing power consumption modes between the general purpose processor 24 and the baseband processor 12. Also coupled to the bus 16 is a digital signal processor 18. The digital signal processor 18 communicates with a memory 22 over a bus 20 in one embodiment.

In some cases, both the baseband processor 12 and the general purpose processor 24 may have software for implementing a power saving feature. To do so, each processor 12 or 24 progressively transitions to one or more lower power consumption states. A variety of triggers may be detected to control the transition between power consumption states. In one embodiment, these triggers are based on inactivity or activity. Namely, inactivity causes a processor 12 or 24 to transition to a lower power consumption state and activity causes a processor 12 or 24 to power back to a higher power consumption state.

In lower power consumption states, such as a sleep mode, power consumption is reduced but the subsystem's ability to promptly act on and execute tasks may also be reduced. Thus, a subsystem may need to transition to a higher power consumption state to effectively handle various conditions and to take required actions.

In some embodiments, the communications and application subsystems may be implemented on separate integrated circuits. In other embodiments, separate processors may be provided on the same integrated circuit. In still other embodiments, a single processor may operate both the application and communications subsystems, in which case these subsystems may consist of software or software and hardware. In general, the communications subsystems is involved in establishing communications and the application subsystem is involved with all other software functions.

Figure 2:
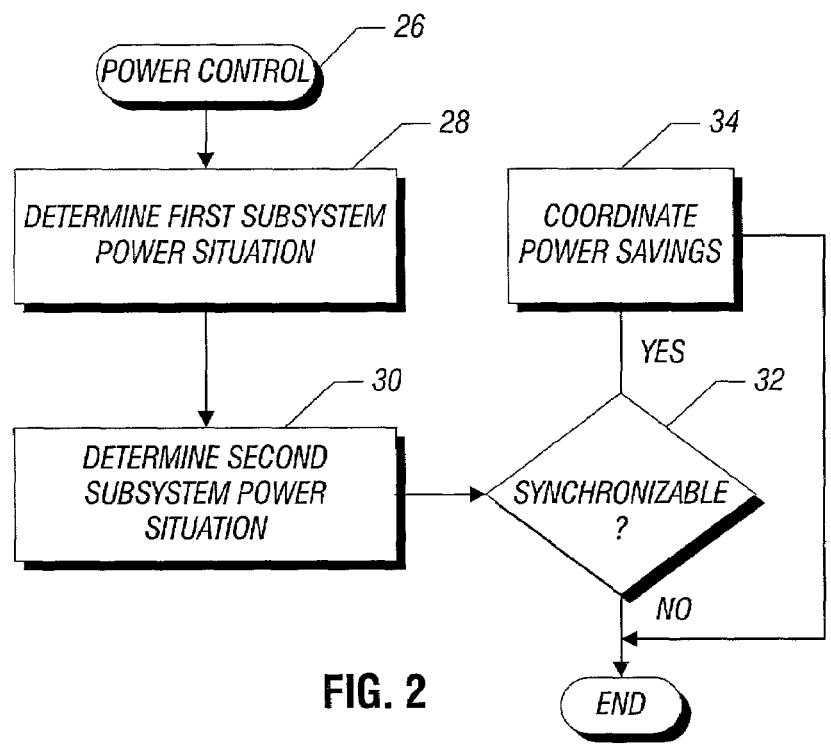
FIG. 2 is a flow chart for software in accordance with one embodiment of the present.

Referring to FIG. 2, the power control software 26 may be a separate module which alters activities on one of two subsystems, such as the communication and application subsystems, in view of information exchanged between the two subsystems. For example, one subsystem may provide information which causes the other subsystem to change an activity so as to avoid waking the other subsystem. As another alternative, the two subsystems may exchange sufficient information to enable them to synchronize activities with respect to their power consumption states. In some cases, these activities may be altered in order to reduce power consumption. In other cases, these activities may be coordinated in view of power consumption information in order to optimize or improve the performance of each subsystem through synchronization.

In some cases, a separate module, separate from both the first and second subsystems, may be utilized to receive information from one or more subsystems and to coordinate activities on those subsystems. In some cases, the control module may be within each independent subsystem. Thus, each independent subsystem may receive and may use information to alter its activities to achieve a desirable condition, such as reduced power consumption or better coordination between subsystems. In some cases, independent subsystems may assign one subsystem to be the master relative to other subsystems. In such case, the other subsystems may alter their activities to coordinate with the master in one embodiment. As still another option, each subsystem may arbitrate to determine which subsystem should alter its activities. As still a third possibility, in accordance with some embodiments, each subsystem may try, to the best possible extent, to accommodate the other subsystems.

In general, at least one subsystem may share information about power consumption status with another subsystem. In some cases, one subsystem may provide power consumption state information to another subsystem. As still another alternative, one subsystem may provide information about the duration of a particular power consumption state to another subsystem. As yet another example, one subsystem may provide a schedule of power consumption state changes to another subsystem. As still another alternative, one system may provide information indicating the probabilities of a particular state change or other activities that may effect power consumption.

In some embodiments, a first subsystem may provide the state information automatically to another subsystem or to an overriding control module. As yet another alternative, one subsystem may provide state information upon request. As still another alternative, one subsystem may provide information to the other subsystem or to an appropriate control module when a particular event is detected.

In FIG. 2, the power control software 26 initially determines the power situation of the first subsystem, as indicated in block 28 and the second subsystem in block 30. In such an embodiment, the power control software 26 may be a separate module to receive information from each of the subsystems. However, as described above, the software 26 may be a part of one or both of the first and second subsystems.

Based on the information, a check at diamond 32 determines whether it is possible for one subsystem to alter one of its activities in view of power consumption information received from the other subsystem. If so, the power consumption may be coordinated as indicated in block 34. Otherwise, no corrective action is taken.

Figure 3:
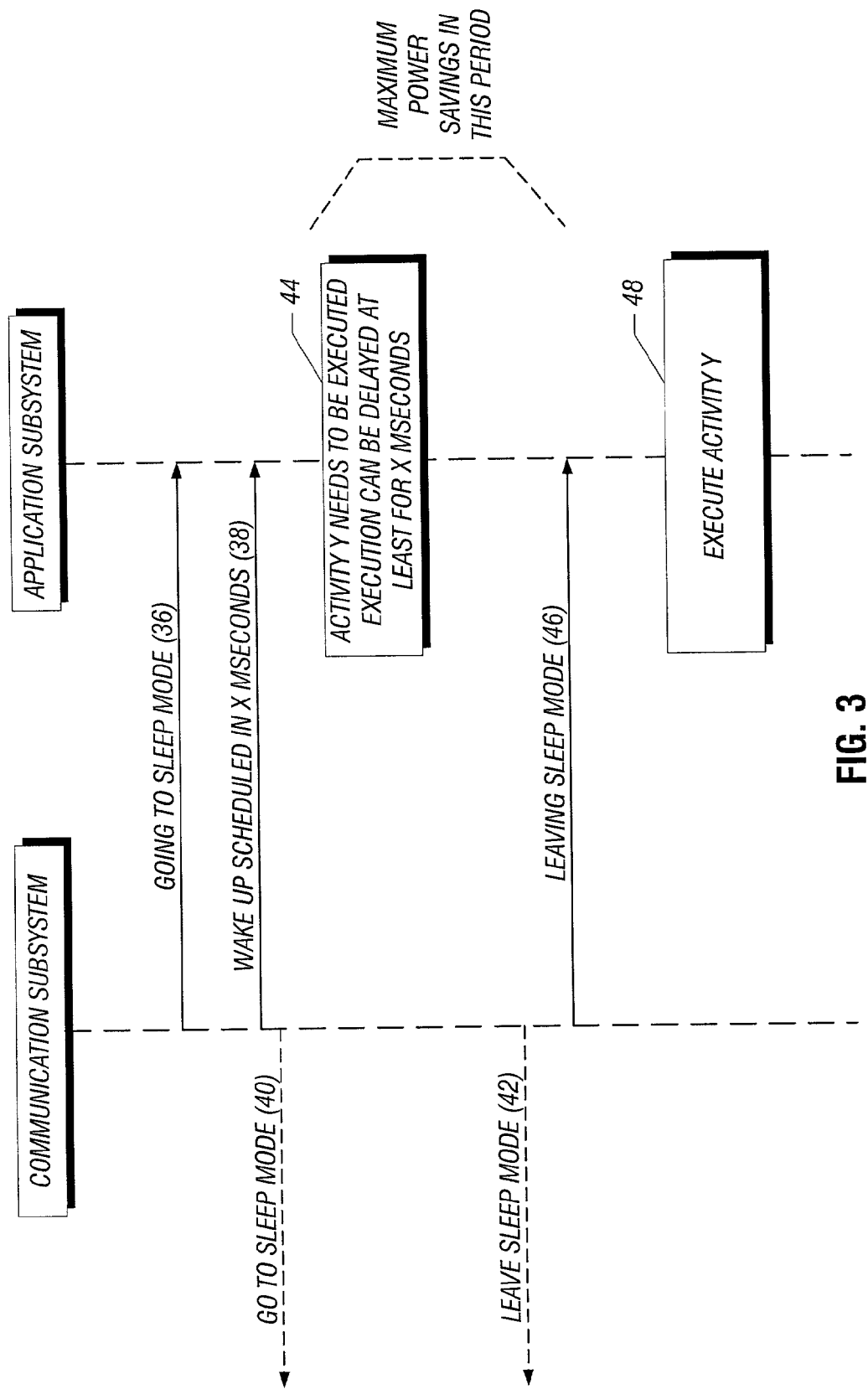
FIG. 3 is a communications diagram in accordance with one embodiment of the present invention.

For example, referring to FIG. 3, a specific example of the implementation of power control software 26 is illustrated without limiting the generality of the present invention. The communications subsystem may send a signal to the application subsystem that it is going to a sleep mode as indicated at 36. Another signal 38 may also indicate that a wake-up of the communications subsystem is scheduled for X microseconds. Thereafter, the communications subsystem may go into the sleep mode as indicated at 40.

Meanwhile, in the application subsystem, there is a particular activity Y that needs to be executed. As indicated in block 44, execution by the application subsystem can be delayed but executing that activity necessitates that the communications subsystem not be in its sleep mode at least for X microseconds (the duration of the communications subsystem sleep mode). Thus, execution by the application subsystem may be delayed to avoid "waking up" the communications subsystem. Since the application subsystem has been advised of the wake-up time of the communications subsystem, the application subsystem can determine that it makes sense to wait to execute activity Y. After the communications system leaves the sleep mode as indicated at 42 in FIG. 3, the communications subsystem sends a signal, as indicated at 46, to the application subsystem. Thereafter, the activity Y may be executed as indicated in block 48.

Increased power savings may occur in the period of the delay determined in block 44. This is because if activity Y were executed when originally triggered, activity Y would have caused the communications subsystem to be powered up (i.e., leave the sleep mode prematurely), potentially resulting in inefficiencies and extra power consumption.

Figure 4:
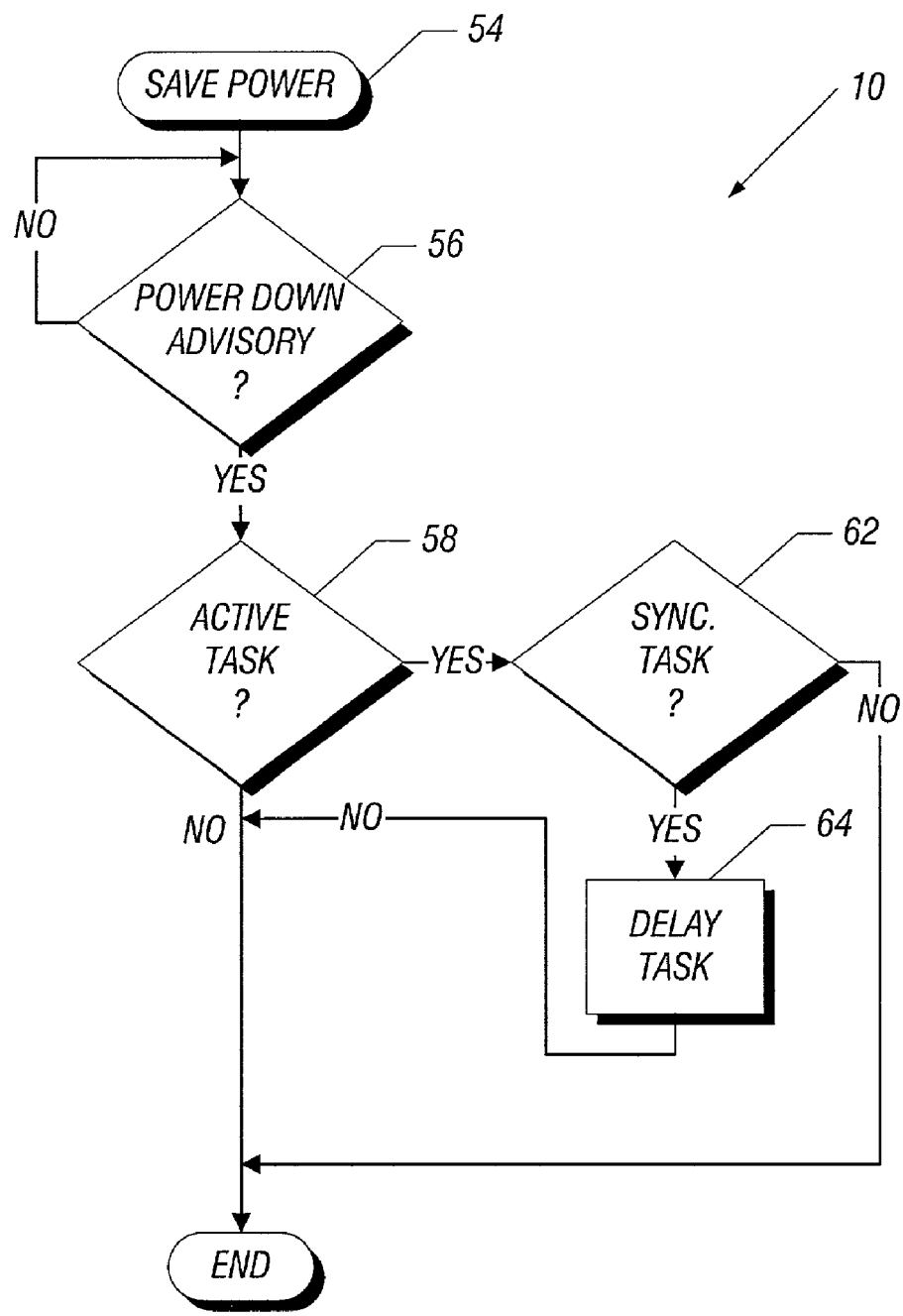
FIG. 4 is a flow chart in accordance with one embodiment of the present invention.

Thus, the software 54, which may be run by the application subsystem, in one embodiment, begins by determining whether a power down advisory has been received as indicated in FIG. 4 at diamond 56, in one embodiment. If so, and if an active task is received as indicated in diamond 58, a check determines whether or not it is possible to synchronize the execution of the active task with the sleep schedules or power down schedule of the communications subsystem as indicated in diamond 62. If so, the task may be delayed or otherwise rescheduled and then the power down may proceed as indicated in block 60. Otherwise, if no synchronization is determinable, the system may just proceed in any case.

In some embodiments, the application subsystem may be the de facto master that determines whether to alter its execution to fit the needs of the communications subsystem. In other cases, the communications subsystem and application subsystems may act in a peer to peer relationship with respect to scheduling activities relative to power conservation. As still another embodiment, the communications subsystem may be the de facto master. In some embodiments, one or the other of the subsystems may yield its activities in favor of the power down states of the other system to the extent feasible. While an example is given in which activities are deferred until after a reduced power consumption mode, in other embodiments, one subsystem may be advised to complete an activity before the transition to a reduced power consumption mode is entered.

In some cases, a software module may control the transitions between power consumption modes and may coordinate those transitions between the communications and applications subsystems. Thus, in some cases, both subsystems may enter a power savings mode at the same time. The time of entering the reduced power consumption mode may be determined by the software module in view of the upcoming tasks of each subsystem.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   operating first and second subsystems in a wireless device; and
   altering an activity of the first subsystem at least in part based on power consumption information from the second subsystem to avoid a transition on said second subsystem to an increased power consumption state.

2. The method of claim 1 wherein altering an activity on the first subsystem includes changing an activity on the first subsystem to avoid causing the second subsystem to transition between power consumption states.

3. The method of claim 1 wherein altering an activity on the first subsystem includes changing an activity on the first subsystem to synchronize the power consumption states between the first and second subsystems.

4. The method of claim 1 including providing state information from the second subsystem to the first subsystem.

5. The method of claim 4 wherein providing information includes providing information about the duration of a particular power consumption state.

6. The method of claim 4 wherein providing information includes providing information about the schedule of power consumption state changes.

7. The method of claim 1 including altering an activity of the first subsystem in order to reduce power consumption.

8. The method of claim 4 including providing the information automatically.

9. The method of claim 4 including providing the information in response to a request.

10. The method of claim 4 including providing the information when an event is detected.

11. An article comprising a medium storing instructions that enable a processor-based system to:
 operate first and second subsystems in a wireless device; and
 alter an activity on said first subsystem at least in part based on power consumption information from the second subsystem to avoid a transition on said second subsystem to an increased power consumption state.

12. The article of claim 11 further storing instructions that enable the processor-based system to change an activity on the first subsystem to avoid causing the second subsystem to transition between power consumption states.

13. The article of claim 11 further storing instructions that enable the processor-based system to change an activity on the first subsystem to synchronize the power consumption states between the first and second subsystems.

14. The article of claim 11 further storing instructions that enable the processor-based system to provide state information from the second subsystem to the first subsystem.

15. The article of claim 14 further storing instructions that enable the processor-based system to provide information about the duration of a particular power consumption state.

16. The article of claim 14 further storing instructions that enable the processor-based system to provide information about the schedule of power consumption state changes.

17. The article of claim 11 further storing instructions that enable the processor-based system to alter an activity on the first subsystem in order to reduce power consumption.

18. The article of claim 14 further storing instructions that enable the processor-based system to provide the information automatically.

19. The article of claim 14 further storing instructions that enable the processor-based system to provide the information in response to a request.

20. The article of claim 14 further storing instructions that enable the processor-based system to provide the information when an event is detected.

21. A wireless device comprising:
 a first subsystem; and
 a second subsystem to provide power consumption information to said first subsystem to enable said second subsystem to avoid a transition to an increased power consumption state.

22. The device of claim 21 wherein said device is a wireless telephone.

23. The device of claim 22 wherein said first subsystem is an application subsystem.

24. The device of claim 23 wherein said second subsystem is a communication subsystem.

25. The device of claim 24 wherein said communications subsystem includes a baseband processor.

26. The device of claim 25 wherein said application subsystem includes a general purpose processor.

27. The device of claim 21 wherein said first subsystem alters an activity of the first subsystem based at least in part on power consumption information from the second subsystem.

28. The device of claim 27 wherein the first subsystem changes an activity on the first subsystem to avoid causing the second subsystem to transition between power consumption states.

29. The device of claim 27 wherein the first subsystem changes an activity on the first subsystem to synchronize the power consumption states between the first and second subsystems.

30. The device of claim 21 wherein the second subsystem provides power consumption state information to the first subsystem.

* * * * *